(12) United States Patent
Beach et al.

(10) Patent No.: US 6,222,872 B1
(45) Date of Patent: Apr. 24, 2001

(54) DELIVERING PUMP LIGHT TO A LASER GAIN ELEMENT WHILE MAINTAINING ACCESS TO THE LASER BEAM

(75) Inventors: Raymond J. Beach, Livermore; Eric C. Honea, Sunol; Stephen A. Payne, Castro Valley, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/396,966

(22) Filed: Sep. 15, 1999

(51) Int. Cl.[7] .................................................. H01S 3/08
(52) U.S. Cl. ............................ 372/101; 372/9; 372/98; 372/107; 372/108
(58) Field of Search ...................... 372/69–72, 101, 372/9, 107, 108; 385/31, 98

(56) References Cited

U.S. PATENT DOCUMENTS 5,307,430 * 4/1994 Beach et al. .......................... 372/101
6,049,558 * 4/2000 Harada et al. ........................ 372/107

* cited by examiner

Primary Examiner—Leon Scott, Jr.
(74) Attorney, Agent, or Firm—Alan H. Thompson; Eddie E. Scott

(57) ABSTRACT

A lens duct is used for pump delivery and the laser beam is accessed through an additional component called the intermediate beam extractor which can be implemented as part of the gain element, part of the lens duct or a separate component entirely.

24 Claims, 4 Drawing Sheets

DELIVERING PUMP LIGHT TO A LASER GAIN ELEMENT WHILE MAINTAINING ACCESS TO THE LASER BEAM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the use of lens ducts to deliver pump light to laser gain materials, and more specifically, it relates to means for delivering pump light to a laser gain element while maintaining access for a laser or probe beam.

2. Description of Related Art

The design of solid-state lasers is greatly determined by the architecture for pump light delivery and similarly, the brightness (W/cm2-steradian) of pump light. For instance, some devices utilize pump light impinging on a face of a slab or along the barrel of a rod in a geometry commonly referred to as side-pumping. However, in some cases, it is desirable to utilize an end-pumping geometry in order to achieve high delivery efficiency, or due to limitations in the absorption length due to dopant concentration.

Because of limitations in diode array brightness, it is often desirable to confine the pump light in the gain element via total internal reflection (TIR), since the Rayleigh range may be much less than the absorption length. The limited diode brightness also places limitations on access to the laser beam if the pump light fills the entire cross-sectional area of the gain element. One geometry for diode-array end-pumping uses a dichroic coating on one endface of the laser gain element to achieve high reflectivity at the laser wavelength and high transmission for the pump wavelength over its angular distribution. This allows the pump light to be delivered through this endface while the laser beam is reflected off of the same face and extracted from the laser medium through another face, usually the other endface. However, the use of the dichroic coating places restrictions on how close the pump and laser wavelengths can be, as well as the angular distribution of the pump light. In addition, there are situations where pump light enters the gain element through a surface and it would be desirable to access the laser beam through the same surface, for instance to pump both ends of a slab or rod.

SUMMARY OF THE INVENTION

It is an object of the present invention to provide an intermediate beam extractor (IBE).

It is another object of the present invention to provide means to access a laser beam through the pumped face of a laser gain element by appropriate design of the gain element and the pump delivery optical train.

Still another object of the invention is to provide designs for laser amplifiers and laser oscillators that utilize one or more lensing ducts and one or more intermediate beam extractors such that pump light may be delivered to a gain medium while maintaining access to the laser beam.

Another object of the invention is to provide an intermediate beam extractor with turning mirrors made therein to redirect light back into the laser gain medium.

It is another object of the invention to provide laser oscillators and amplifiers that utilize on each end of a laser gain medium a laser diode array optical pump source directed through a lensing duct and an intermediate beam extractor while maintaining access the the laser beam.

Another object of the invention is to provide a dot mirror placed on an intermediate beam extractor such that pump light is funneled around the dot mirror.

The invention is an intermediate beam extractor (IBE). A lens duct is used to deliver pump light through the IBE into a laser gain medium. The laser beam is accessed through the intermediate beam extractor which can be implemented as part of the gain element, part of the lens duct or a separate component entirely. The IBE comprises an optically transparent material and a plurality of continuously extending flat sides interconnecting the first and second end faces of the IBE. The first end face has a greater cross-section than the second end face and the first end face has a greater cross-section than the smaller cross-section area end face of a lensing duct. The first end of the IBE is positioned to receive a pump beam after it exits the smaller cross-section area end of the lensing duct. U.S. Pat. No. 5,307,430, titled "Lensing Duct", describes the lensing duct in detail.

The intermediate beam extractor is included in several embodiments of lasers and laser amplifiers. One embodiment is an apparatus, comprising a lensing duct having an optically transparent material, first and second ends and a plurality of continuously extending flat sides interconnecting the ends, where said one end of the lensing duct has a greater cross-section than the other end. A laser diode array is used for production of a pump laser beam, where the laser diode array is configured to direct the pump laser beam onto the larger cross-section end of the lensing duct and the pump laser beam exits from the smaller cross-section end of the lensing duct. The IBE is positioned to receive the pump beam after it exits from the smaller cross-section end of the lensing duct. A laser gain medium is positioned to receive the pump laser beam after it exits the IBE.

A dual-end-pumped slab laser gain module has been designed where pump light is delivered to both ends of a slab gain element with the laser beam entering and exiting at an angle greater than that of the pump light. An important aspect of the design is the means to extract the laser beam with minor impact on pump delivery efficiency. The additional optical component can be fabricated as part of the gain element or as a separate component. The optical components may also have beneficial properties in suppressing parasitic modes, in addition to their purpose of pump light delivery and laser beam extraction.

DETAILED DESCRIPTION OF THE INVENTION

Figure 1A:
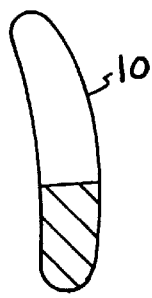
FIGS. 1A and 1B show a sketch of a laser gain element of arbitrary shape.
Figure 1B:
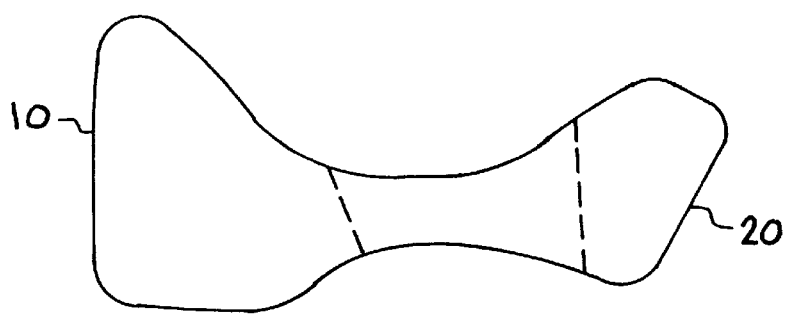

FIGS. 1A and 1B show a sketch of a laser gain element of arbitrary shape, for which optical surfaces can be identified as surface 10 and surface 20 (FIG. 1B only). The invention involves the partial occlusion of said optical surfaces with a diode array or pump light delivery system such as a lens duct or other system. The remaining non-occluded portion of the optical surface serves to access the coherent laser beam. FIGS. 1A and 1B also encompass combinations of laser gain elements and pump delivery optics with dashed lines showing possible breaks between the laser gain element and the pump delivery optics. Several practical devices are based on this concept.

Figure 2:
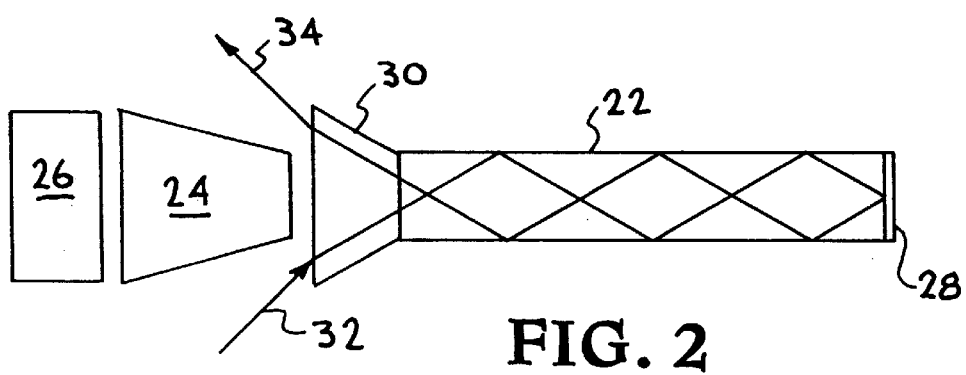
FIG. 2 shows a schematic of a diode-array end-pumped zigzag slab laser gain element utilizing an intermediate beam extractor to enable the pump light to be delivered to the slab while allowing access for the laser beam.

FIG. 2 shows a sketch of a laser slab 22 using a lens duct 24 to deliver pump light from diode array 26. Laser slab 22 includes a highly reflective coating 28 on one end. An intermediate beam extractor 30 is located between lens duct 24 and an end of laser slab 22. The intermediate beam extractor (IBE) 30, is the subject of this disclosure. This component acts as a continuation of the lens duct which serves to deliver the pump light from a large diode laser array to a smaller cross-sectioned laser slab.

Various embodiments of the lens duct usable in the present invention are disclosed in U.S. Pat. No. 5,307,430, titled "Lensing Duct", incorporated herein by reference. Other related disclosure of hollow lensing ducts may be found in U.S. patent application Ser. No. 09/182155, filed Oct. 21, 1998 titled "Hollow Lensing Duct", incorporated herein by reference.

The feature which distinguishes the IBE from the lens duct is that the IBE not only serves to in-couple pump radiation to the slab but also serves to in-couple or out-couple the laser radiation that is to be amplified or (that has been amplified) by the slab. The in-coupling and out-coupling of laser radiation is accomplished by having the IBE flange out at a larger opening angle than does the lens duct. This allows the IBE to have two faces, one on either side of the center that serve to let laser beams exit and enter the device.

The configuration of FIG. 2 reveals a top view of a zig-zag laser amplifier in which the beam to be amplified is passed into the slab through one face of the IBE and then double passes the slab prior to exiting the other face of the IBE. This particular configuration is pumped at one end and may have a HR coating applied to the other end, or alternatively, the laser beam could exit the slab and be redirected back into the slab with external optics. Specifically, light from laser diode array 26 propagates through lens duct 24 and IBE 30 to optically pump laser slab 22. A laser beam 32 is directed through IBE 30 into laser slab 22. After undergoing total internal reflection within laser slab 22, laser beam 32 reflects from the highly reflective coating 28, to exit from the laser slab 22 and the IBE 30 as amplified laser beam 34.

Figure 3:
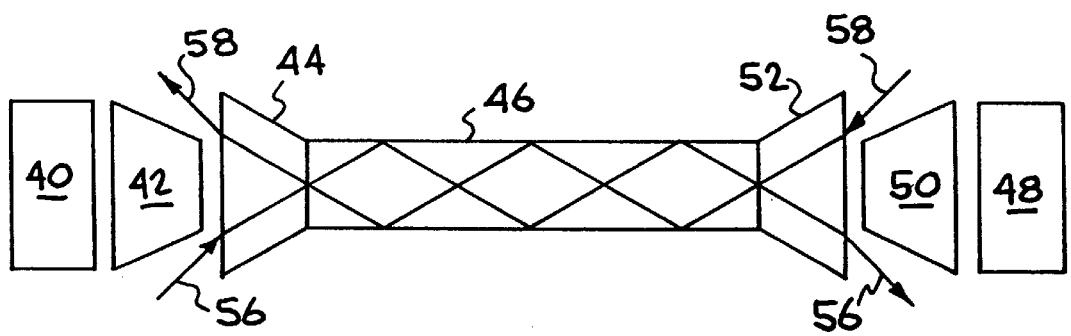
FIG. 3 shows an embodiment where a laser slab is pumped through an IBE located at both ends of the laser slab.
Figure 4A:
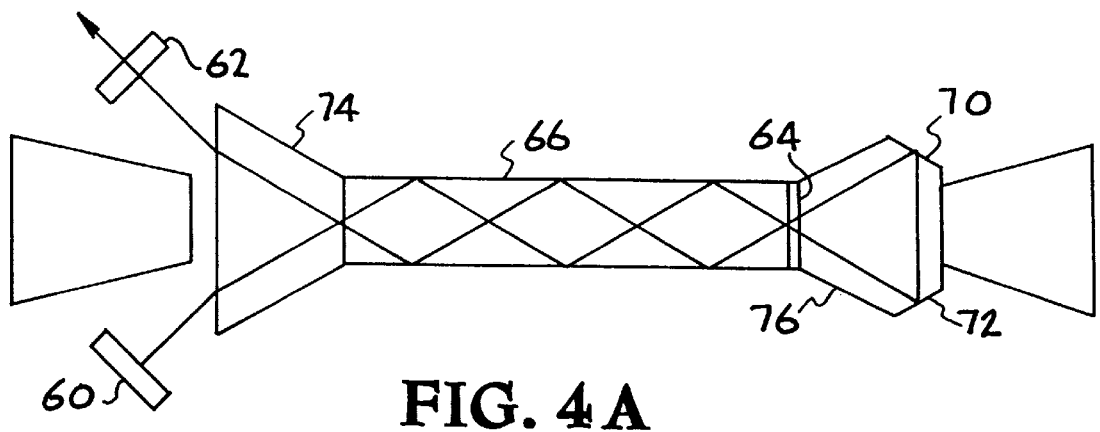
FIG. 4A illustrates a laser design utilizing the IBE of the present invention.
Figure 4B:
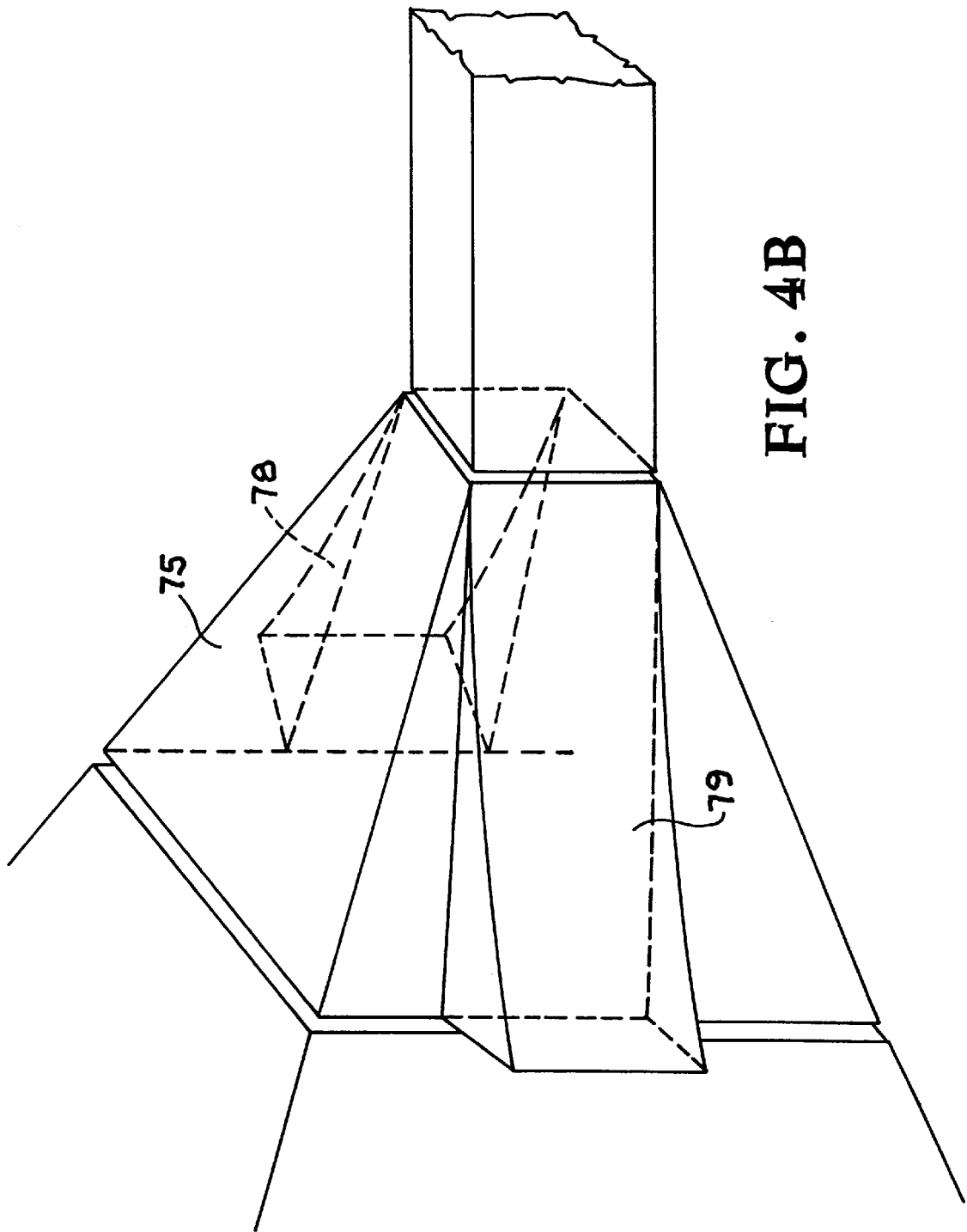
FIG. 4B shows an embodiment where the laser light enters and exits on the side of the IBE.

FIG. 3 shows an embodiment where the slab is pumped at both ends. Pump radiation from diode array 40 propagates through lens duct 42 and IBE 44 into laser slab 46. Pump rediation from diode array 48 propagates through lens duct 50 and IBE 52 into laser slab 54. In this configuration the laser beams 56 and 58 which are to be amplified in the zig-zag slab enter and exit the slab after a single pass through the laser slab 46. This embodiment in particular has applicability to many quasi-three level laser schemes in which intense bleach wave pumping is a prerequisite to efficient laser operation FIG. 4A illustrates a laser design utilizing an embodiment of the IBE of the present invention. Pump light from a laser diode array generates laser light along an optical axis defined by a path between high reflector 60 and output coupler 62. This embodiment may be pumped from a single end or from both ends. One embodiment of the single ended pump configuration includes a highly reflective coating 64 on one end of laser slab 66 and an IBE 74 on the other laser slab end. The IBE 74 shown in FIG. 4A can be replaced with IBE 75 shown in FIG. 4B, which includes laser beam access portions 78 and 79, shown to be integral to IBE 75. Another embodiment can be used for either single or double ended pumping by using an IBE 76 on the end of the laser slab 66 instead of the highly reflecting coating 64. Note the formation of mirror surfaces 70 and 72 on the end of IBE 68. These mirror surfaces function to re-direct the output radiation from the slab back into the slab through two reflections, one at each turning mirror.

Figure 5:
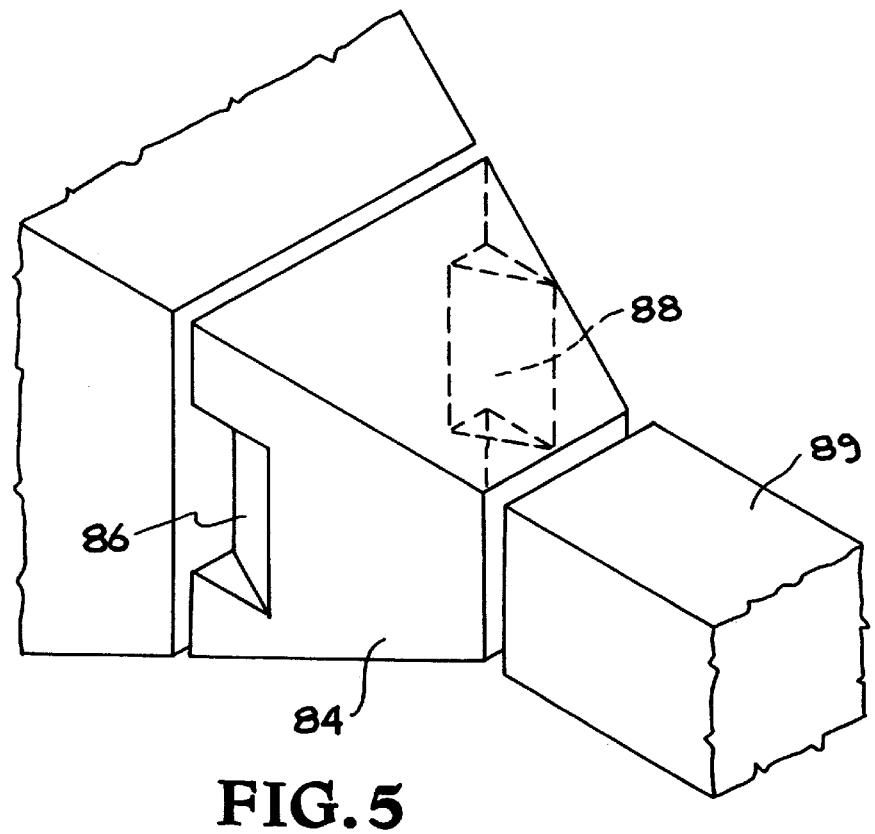
FIG. 5 shows a design the laser beam is confined entirely to the interior of the IBE using turning mirrors.

FIG. 5 shows a design of IBE 84 where the laser beam is confined entirely to the interior of IBE 84 using turning mirrors 86 and 88. In this design, the intermediate beam extractor includes integral turning mirrors for manipulating the laser beam without actually extracting the laser beam from the device. In this particular device, turning mirrors 86 and 88 are fabricated on the IBE 84 itself by cutting appropriately oriented surfaces directly into the body of the IBE 84. The function of these turning mirrors is simply to re-direct the output radiation from the slab 89 back into the slab through two reflections, one at each turning mirror. The advantage of this approach over one in which the pump beam is delivered into the end of a slab through a dichroic coating that serves to pass the pump but reflect the laser light is that the need for the dichroic coating is eliminated. In many laser systems this approach would be attractive as it may not be possible to fabricate a dichroic coating with the required specifications.

Figure 6:
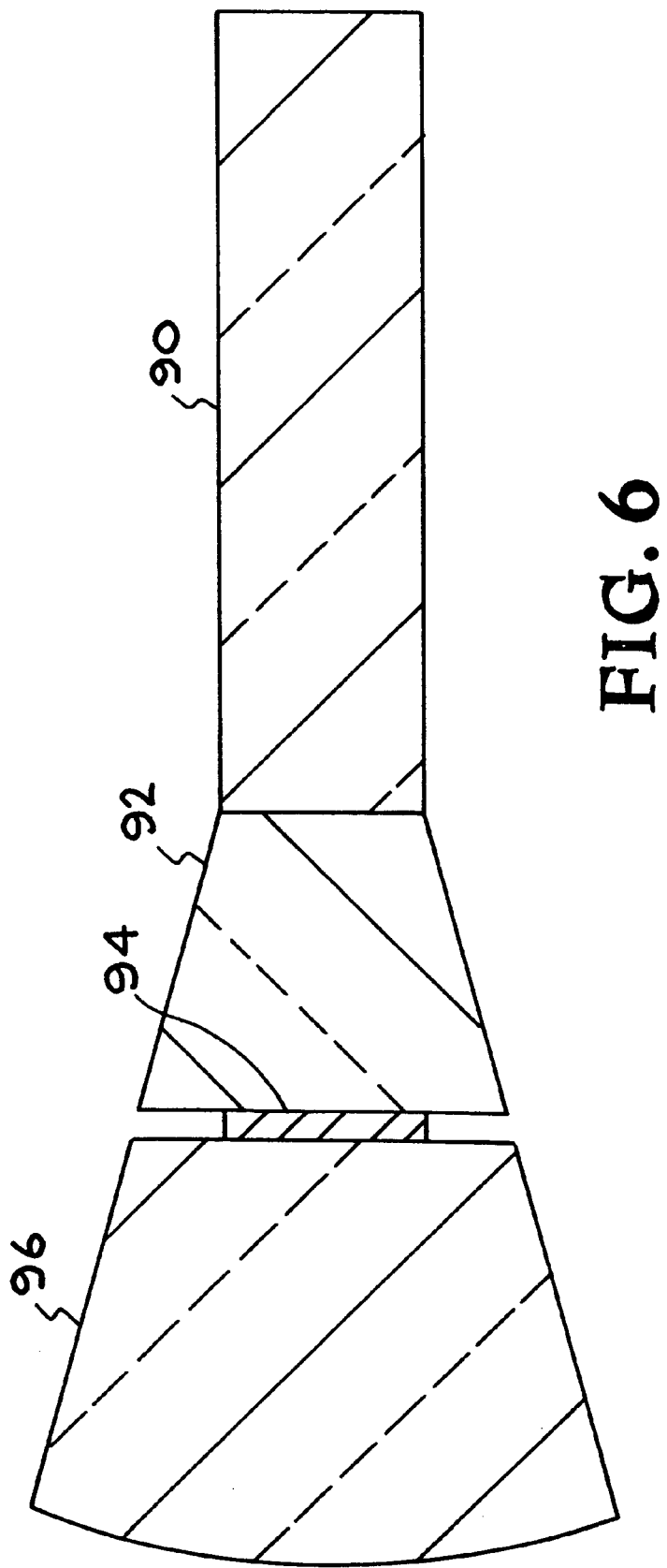
FIG. 6 shows a schematic of a laser rod with a flanged end cap and a dot mirror.

FIG. 6 is an implementation of the present invention which is applicable to both rod and slab geometries. FIG. 6 shows a schematic of a laser rod 90 with a flanged end cap 92 and a dot mirror 94. In this design, the flanged end cap 92 is larger than the laser rod 90 itself. The pump light is delivered to this flange through lens duct 96 while being directed around dot mirror 94 used to reflect the laser beam. In this way the laser beam is reflected with minimal impact on the pump light delivery. This design would be of value, e.g., in a situation where a dichroic coating could not be used on the end face (e.g. because the pump and laser wavelengths were very close).

The foregoing description of preferred embodiments of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

The invention claimed is:

1. An apparatus, comprising:
an intermediate beam extractor (IBE), comprising an optically transparent material, wherein said IBE has an IBE first end and an IBE second end and a plurality of continuously extending flat sides interconnecting said IBE first end and said IBE second end, wherein said IBE first end has a greater cross-section than said IBE second end, wherein said IBE first end has a greater cross-section than the smaller cross-section area end of a lensing duct.

2. The apparatus of claim 1, wherein said IBE first end is positioned to receive a pump beam after it exits said smaller cross-section area end of said lensing duct.

3. The apparatus of claim 1, wherein said lensing duct comprises an optically transparent material, wherein said lensing duct includes a lensing duct first end, a lensing duct second end and a plurality of continuously extending flat sides interconnecting said lensing duct first end and said lensing duct second end, wherein said lensing duct first end has a greater cross-section than said lensing duct second end.

4. The apparatus of claim 3, further comprising a laser diode array, comprising at least one laser diode, for production of a pump laser beam, wherein said laser diode array is configured to direct said pump laser beam onto said lensing duct first end, wherein said pump laser beam exits from said lensing duct second end.

5. The apparatus of claim 3, further comprising a laser gain medium positioned to receive said pump laser beam after it exits said IBE second end.

6. The apparatus of claim 5, wherein said laser gain medium comprises a solid state laser slab gain medium lensing duct second end.

7. The apparatus of claim 6, wherein said gain medium comprises a gain medium first end and a gain medium second end, wherein said gain medium first end is positioned to receive said pump beam after it exits said IBE second end, wherein said gain medium second end comprises a highly reflective coating, wherein a portion of said IBE first end is not occluded by said second end of said lensing duct, wherein said portion is defined as a non-occluded portion, wherein an optical axis is defined by said non-occluded portion and said highly reflective coating, wherein a laser beam propagating on said optical axis will be amplified.

8. The apparatus of claim 7, further comprising a high reflector and an output coupler operatively placed on said optical axis to define an optical cavity.

9. The apparatus of claim 6, wherein said gain medium comprises a gain medium first end and a gain medium second end, wherein said gain medium first end is positioned to receive said pump beam after it exits said second end of said IBE, wherein said gain medium second end comprises a highly reflective coating, wherein a portion of said IBE first end is not occluded by said second end of said lensing duct, wherein said portion is defined as a non-occluded portion, wherein an optical axis is defined by said non-occluded portion and said highly reflective coating, wherein said apparatus further comprises a high reflector and an output coupler operatively placed on said optical axis to define an optical cavity.

10. The apparatus of claim 6, wherein said gain medium comprises a gain medium first end and a gain medium second end, wherein said gain medium first end is positioned to receive said pump beam after it exits said second end of said IBE, wherein said apparatus further comprises a second IBE comprising an optically transparent material, wherein said second IBE has a second IBE first end and a second IBE second end and a plurality of continuously extending flat sides interconnecting said second IBE first end and said second IBE second end, wherein said second IBE first end has a greater cross-section than said second IBE second end, wherein said second IBE first end has a greater cross-section than the smaller cross-section area end of a second lensing duct.

11. The apparatus of claim 10, further comprising a second lensing duct and a second laser diode array, wherein said second lensing duct is positioned to receive a second pump beam from said second laser diode array, wherein said second IBE first end is positioned to receive said second pump beam after it exits the smaller cross-section area end of said second lensing duct.

12. The apparatus of claim 10, wherein said second IBE comprises turning mirrors to re-direct output radiation from said laser gain medium back therein.

13. The apparatus of claim 12, wherein said turning mirrors are facets cut from said second IBE such that light will undergo total internal reflection from said facets to redirect output radiation from said laser gain medium back therein.

14. The apparatus of claim 5, further comprising a dot mirror on said IBE first end, wherein said laser gain medium comprises a laser rod.

15. An apparatus, comprising:
    a lensing duct comprising an optically transparent material, wherein said lensing duct includes a first end, a second end and a plurality of continuously extending flat sides interconnecting said first end and said second end, wherein said first end has a greater cross-section than said second end;
    a laser diode array for production of a pump laser beam, wherein said laser diode array is configured to direct said pump laser beam onto said first end of said lensing duct, wherein said pump laser beam exits from said second end of said lensing duct;
    an intermediate beam extractor (IBE) comprising an optically transparent material, wherein said IBE has an IBE first end and an IBE second end, wherein said IBE first end has a greater cross-section than said IBE second end, wherein said IBE first end has a greater cross-section than said second end of said lensing duct, wherein said IBE first end is positioned to receive said pump beam after it exits said second end of said lensing duct; and
    a laser gain medium comprising a gain medium first end and a gain medium second end, wherein said gain medium first end is positioned to receive said pump beam after it exits said IBE second end.

16. The apparatus of claim 15, wherein said gain medium second end comprises a highly reflective coating, wherein a portion of said IBE first end is not occluded by said second end of said lensing duct, wherein said portion is defined as a non-occluded portion, wherein an optical axis is defined by said non-occluded portion and said highly reflective coating, wherein a laser beam propagating on said optical axis will be amplified.

17. The apparatus of claim 16, further comprising a high reflector and an output coupler operatively placed on said optical axis to define an optical cavity.

18. The apparatus of claim 16, wherein said apparatus further comprises a second IBE comprising an optically transparent material, wherein said second IBE has a second IBE first end and a second IBE second end and a plurality of continuously extending flat sides interconnecting said second IBE first end and said second IBE second end, wherein said second IBE first end has a greater cross-section than said second IBE second end, wherein said second IBE first end has a greater cross-section than the smaller cross-section area end of a second lensing duct.

19. The apparatus of claim 18, further comprising a second lensing duct and a second laser diode array, wherein said second lensing duct is positioned to receive a second pump beam from said second laser diode array, wherein said second IBE first end is positioned to receive said second pump beam after it exits the smaller cross-section area end of said second lensing duct.

20. The apparatus of claim 18, wherein said second IBE comprises turning mirrors to re-direct output radiation from said laser gain medium back therein.

21. The apparatus of claim 20, wherein said turning mirrors are facets cut from said second IBE such that light will undergo total internal reflection from said facets to redirect output radiation from said laser gain medium back therein.

22. The apparatus of claim 15, further comprising a dot mirror on said IBE first end, wherein said laser gain medium comprises a laser rod.

23. In an apparatus comprising:

a lensing duct comprising an optically transparent material, wherein said lensing duct includes a first end, a second end and a plurality of continuously extending flat sides interconnecting said first end and said second end, wherein said first end has a greater cross-section than said second end;

a laser diode array for production of a pump laser beam, wherein said laser diode array is configured to direct said pump laser beam onto said first end of said lensing duct, wherein said pump laser beam exits from said second end of said lensing duct; and a laser gain medium positioned to receive said pump laser beam after it exits said second end, the improvement comprising:

an intermediate beam extractor (IBE) comprising an optically transparent material, wherein said IBE has an IBE first end and an IBE second end, wherein said IBE first end has a geater cross-section than said IBE second end, wherein said IBE first end has a greater cross-section than said second end of said lensing duct, wherein said IBE first end is positioned to receive said pump beam after it exits said second end of said lensing duct.

24. An intermediate beam extractor (IBE) for placement between a lensing duct and a laser gain medium, comprising:

an optically transparent material, wherein said IBE has an IBE first end and an IBE second end and a plurality of continuously extending flat sides interconnecting said IBE first end and said IBE second end, wherein said IBE first end has a geater cross-section than said IBE second end, wherein said IBE first end has a greater cross-section than the smaller cross-section area end of a lensing duct.

* * * * *